E. STOCKER & J. K. BERTZ.
Hose-Couplings.

No. 155,268.  Patented Sept. 22, 1874.

Witnesses:  Inventors:

UNITED STATES PATENT OFFICE.

EDWARD STOCKER AND JACOB K. BERTZ, OF LANCASTER, PENNSYLVANIA; SAID BERTZ ASSIGNOR TO CHARLES A. BITNER, OF SAME PLACE.

IMPROVEMENT IN HOSE-COUPLINGS.

Specification forming part of Letters Patent No. 155,268, dated September 22, 1874; application filed July 23, 1874.

*To all whom it may concern:*

Be it known that we, JACOB K. BERTZ and EDWARD STOCKER, of the city of Lancaster, in the State of Pennsylvania, have jointly invented new and useful Improvements in Hose-Couplings, of which the following is a specification:

The object of this invention is to supply a simple hose-coupling, to obviate the use of gum rings or stuffing, and to produce an efficient, water-tight, tapering draw-joint connection, more especially adapted for attaching to hydrants and pavement washers.

The accompanying drawings illustrate the construction and combination of the coupling, so that a brief description will enable those skilled in the art to make the same, in which—

Figure 1:
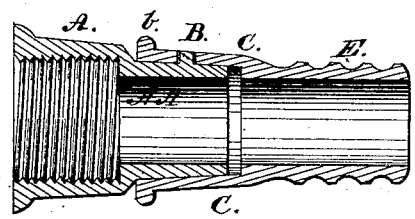
Figure 2:
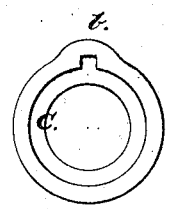
Figure 3:
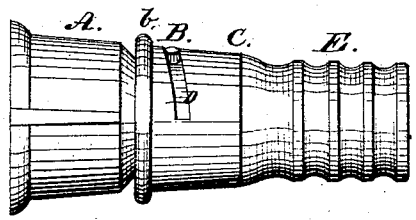

Figure 1 is a sectional view of both tubular pieces combined; Fig. 2, the front or end view of the notched head of the coupling. Fig. 3 shows the external form of the parts combined.

This, like ordinary pipe or hose couplings, consists of two parts, each having an enlarged or socket head with a surrounding flange. The socket or head in part A has a female screw-thread to attach it to a screw-ended nozzle on hydrants, usually made of uniform size and bore for attaching hose. This socket-head A is terminated by a shouldered offset, and prolonged, say an inch or so, into a slightly-tapering pipe, A A, on the outer face of which there is a stout rounded pin or lug, B. The coupling portion C has the interior of the socket-head bored out, so as truly to fit and receive the prolonged tapering pipe A A, which is made so as to draw in the socket-head C, the outer enlarged flange of which has a portion widened out, with a notch, b, to receive the pin B on A A, and allow the same to enter freely on a draw of the pin B in the inclined and open slot D made through the socket-head, in such a manner as to form a wedging lock, when turned in said inclined slot, and thus form a simple, tightly-fitting, tapering joint, so as to be perfectly water-tight. The prolongation E of said socket-head C is corrugated, and to which hose are attached as in the ordinary manner.

We are aware that the pin and slot connection is in itself not new, as it is common in various devices; but we are not aware of any coupling constructed with tapering faces, and pin and slot, so as to draw in locking, as herein shown and described. All the ordinary fittings for this purpose known to us are bored out straight and prone to leak, unless provided with gum rings or stuffing to prevent the same. By this simple arrangement the use of gum is obviated, and all leaking effectually prevented, and simple as it may seem, meets all the required conditions.

We may mention that by casting the nozzles for hydrants with our bevel or taper terminus, with its pin attached, it would answer equally well, and be more convenient, but substantially the same, jointly considered.

What we claim as our invention in hose-couplings is—

The screw-head A, with its tapering prolongation A A and pin B, in combination with the counterpart or shouldered socket C, provided with the oblique slot D, so as jointly to constitute a draw-joint, the whole as and for the purpose specified.

JACOB K. BERTZ.
EDWARD STOCKER.

Witnesses:
JNO. M. AMWEG,
JACOB STAUFFER.